Aug. 30, 1932. G. D. MUGGLETON ET AL 1,875,105
METHOD OF AND APPARATUS FOR MINERAL CHLORINATION
Filed Aug. 7, 1926
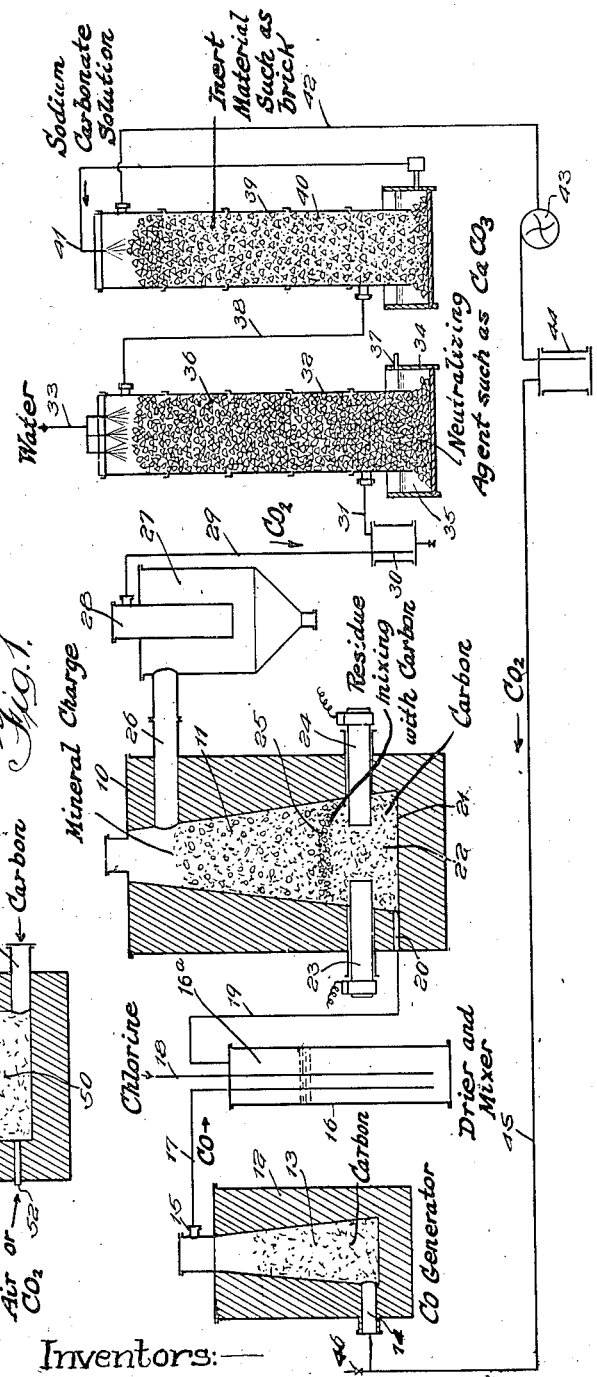
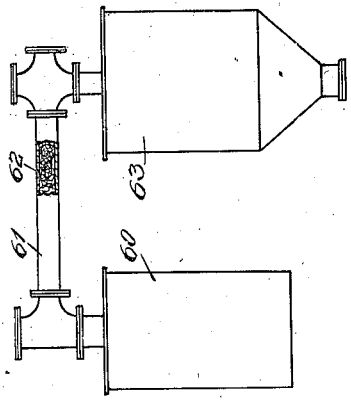
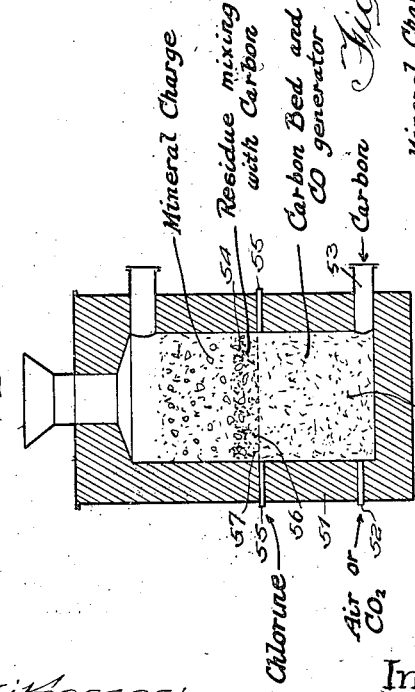
Inventors:—
GERALD D. MUGGLETON. PAUL S. BRALLIER
HAROLD C. VAN GALDER & RALPH F. WEBBER.

Patented Aug. 30, 1932

1,875,105

UNITED STATES PATENT OFFICE

GERALD D. MUGGLETON, PAUL S. BRALLIER, HAROLD C. VAN GALDER, AND RALPH F. WEBBER, OF NIAGARA FALLS, NEW YORK, ASSIGNORS TO NIAGARA SMELTING CORPORATION, OF NIAGARA FALLS, NEW YORK, A CORPORATION OF NEW YORK

METHOD OF AND APPARATUS FOR MINERAL CHLORINATION

Application filed August 7, 1926. Serial No. 127,816.

The present invention relates generally to a process of producing certain metallic chlorides from certain minerals, such for example, as clays. It has particular reference to the production of aluminum chloride from aluminous and silicious clays which may, or may not, contain impurities, such as titanium oxide or iron oxides. This type of clay contains not only alumina and silica, as such, but also aluminium silicates which may vary in composition depending upon the particular clay.

Prior processes for a similar purpose comprise chlorination of the clay in the presence of carbon as a reducing agent. The reaction consists in converting the metals of the mineral oxides into their chlorides, and the oxygen of the oxides into a compound with carbon. The oxidation of the carbon, being conducted in the presence of carbon, yields carbon monoxide as the oxidation product. This oxidation reaction contributes a portion of the heat necessary to maintain the chlorination reaction.

One disadvantage of the former processes is the difficulty of supplying the necessary heat for the chlorination reaction. Electrically heated resistor carbon floors have been employed in connection with the chlorinating furnace to keep the clay charge, admixed with carbon, at the proper chlorination temperature. This necessity for supplying heat to the chlorination reaction has made it difficult to construct and operate large chlorination units.

Another disadvantage of the prior processes is the necessity for admixing carbon with the charge of clay, the prime motive being, of course, to provide the reducing agent.

The present invention is based in part upon the discovery that certain of the constituents of the minerals for example the silica and some of the aluminum silicates, cannot be readily chlorinated unless in contact with heated carbon as the reducing agent, while other constitutents, for example, alumina, iron oxide and titanium oxide, can be chlorinated without contact with the carbon, but in the presence of carbon monoxide as the reducing agent. Accordingly, one object of the invention is to provide for the selective chlorination of minerals.

The selective chlorination, therefore, permits a clay to be treated without using carbon as the reducing agent. Another feature of the invention is the use of carbon monoxide as the reducing agent with the formation of carbon dioxide. In the absence of carbon there is no danger of reducing the resulting carbon dioxide back to carbon monoxide and, therefore, the full heat of combustion of carbon monoxide to carbon dioxide is obtained. This heat of combustion is more than twice as great as the heat of combustion of carbon to carbon monoxide, as obtained in the prior processes. It has been found that the greater heat of combustion provides sufficient heat to carry out the chlorination reaction without supplying externally more heat to the charge. Thus another object of the invention is to provide a chlorination proces which does not require supplying heat to the charge being chlorinated.

Since carbon dioxide is a waste product of the process and since carbon monoxide is a factor in the main reaction, it is a particular object of the invention to circulate the carbon in gaseous form by regenerating the carbon dioxide as carbon monoxide in a suitable regenerator, such as a bed of heated carbon.

Another object of the invention is to provide a preheater for the gases supplied to the chlorinating chamber.

A further and a very important object of the invention is to provide the above mentoined preheater as a bed of carbon in the chlorinator.

The selective chlorination of the clay above alluded to results in an unchlorinated waste or ash resulting from the mineral constituents which are not reduced and chlorinated by carbon monoxide and chlorine in the first stage of the selective chlorination process. In order to prevent an accumulation of this ash, or to eliminate its removal mechanically, it is allowed to move into the carbon bed of the preheater, where its chlorination occurs by contact with the heated carbon according to the reaction heretofore taking place in prior processes. One product of such reaction is carbon monoxide and, therefore, the preheater serves as a carbon monoxide generator. Therefore, another object of the invention is to provide a carbon monoxide generator intermediate the chlorinator and the chlorine supply.

The products of the selective chlorination stages may be combined and wthdrawn together as in prior processes. A further object of the invention is to provide for the condensation, separation and purification of the desired products and for the saving and return of the carbon dioxide from the condensation system to the carbon monoxide regenerator.

Still other and ancillary objects and advantages of the invention will be apparent to those skilled in the art after comprehending the exemplary process hereinafter disclosed and described as carried out in the form of apparatus illustrated in the accompanying drawing, in which:—

Figure 1 is a diagrammatic arrangement of the apparatus as used in the process;

Figure 2 is a modification of the chlorinator in which is incorporated the carbon monoxide generator; and Figure 3 is a still used in purifying the aluminum chloride from the iron chloride content.

Although the process is capable of being conducted in a variety of other ways by modifications and other arrangements of the steps and by other apparatus, it is to be understood that the disclosure more particularly hereinafter describing the process and the apparatus in detail, is not to be construed as a limitation of the invention. In the appended claims it is aimed to define the invention not only as specifically described, but also in its broadest aspect independently of the particular disclosure.

The invention is herein set forth as employed to chlorinate a clay containing alumina, silica, iron oxides, titanium oxide, and various aluminum silicates. The chlorination is carried out selectively by treating the charge of clay with chlorine and carbon monoxide at a suitable temperature to effect the desired reactions, as follows:—

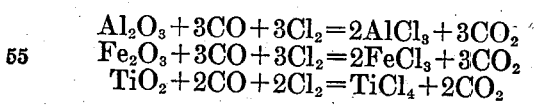

$$Al_2O_3 + 3CO + 3Cl_2 = 2AlCl_3 + 3CO_2$$
$$Fe_2O_3 + 3CO + 3Cl_2 = 2FeCl_3 + 3CO_2$$
$$TiO_2 + 2CO + 2Cl_2 = TiCl_4 + 2CO_2$$

Under these conditions the remaining constituents of the clay are not chlorinated. Thus a residual material is left from the first stage of chlorination.

The apparatus employed preferably comprises a chlorinator 10 in which a clay charge 11 is placed. The clay may be continuously supplied, if desired. The carbon monoxide is obtained chiefly from a carbon monoxide generator 12, which is preferably filled with heated carbon 13 to reduce carbon dioxide entering the generator at 14. The carbon monoxide emitted from the generator at 15 may contain some water vapor, which is desirably removed in a drier, of which the washer 16 is an example. This washer or drier contains strong sulphuric acid which removes the moisture from the gas. It is also used as a mixer for the chlorine and carbon monoxide, as well as a drier for both. The carbon monoxide enters through pipe 17 and the chlorine enters through pipe 18, both of which discharge at the bottom. The dried gases, containing preferably an excess of carbon monoxide, mix in the upper part 16ª of the washer and are carried by a pipe line 19 to the chlorinator, entering at 20.

In the chlorinator the gases act on the charge 11 and remove certain of the constituents as volatile products, leaving the remainder as a waste or ash. It is needless to say that the charge is initially at the proper temperature to effect the reactions desired. After the reaction is started the heat of combustion of carbon monoxide to carbon dioxide is sufficient to maintain the chlorination reaction without otherwise heating the charge.

As a means for starting the reaction a heater is provided at the bottom of the chlorinator intermediate the gas inlet 20 and the charge 11. One function of the heater is to preheat the gases entering at 20 to about 600° to 900° Centigrade in order to effect initial reaction, and later, if desired, to prevent cold gases cooling the first traversed portions of the charge so that the reaction is always complete.

The preheater, generally designated 21, is so constructed that it has additional functions. It comprises a body of heated carbon, such as resistor carbon 22, heated by electrodes 23 and 24. The carbon thus serves to convert any carbon dioxide entering the chlorinator at 20 into carbon monoxide, and great care need not be taken to provide pure carbon monoxide from the generator 12. Thus the preheater 21 serves also as a carbon monoxide generator.

The preheater and carbon monoxide generator 21 has still another function by virtue of the fact that the clay charge 11 is in direct contact with the carbon 22 of the heater. The ash or waste in the clay charge, which is not converted into chloride by the carbon monoxide and the chlorine, naturally accumulates and gravitates to the bottom of the charge 11 as the other portions are volatilized away. By providing incandescent carbon at the bottom of the charge in the presence of chlorine, these constituents are attacked, carbon acting as the reducing agent rather than carbon monoxide. The gravitating waste which cannot be attacked by the carbon monoxide and chlorine settles into the interstices of the carbon mass 22 forming a limited zone 25 wherein the following reactions occur:—

$$SiO_2 + 2C + 2Cl_2 = SiCl_4 + 2CO$$

$$Al_2Si_3O_9 + 9C + 9Cl_2 = 2AlCl_3 + 3SiCl_4 + 9CO$$

Thus more carbon monoxide is generated from the carbon 22 and the oxygen of the ash, which carbon monoxide passes on through the upper part of the charge. While it is preferable to admit at the port 20 an excess of carbon monoxide over chlorine required for the chlorination, it is not necessary, since additional carbon monoxide is formed in the retort when the two stages of chlorination are thus conducted substantially together by the contiguity of the carbon bed with the ash of the first stage of the chlorination. The amount of such carbon monoxide so produced in the second stage of the chlorination will, of course, be dependent upon the nature of the clay used and the amount of ash left from the first stage. This reaction, of course, consumes some of the carbon 22, which may be replenished in any suitable manner.

From an examination of the above it will be seen that the first stage of chlorination yields chlorides of aluminum, iron and titanium, while the second stage yields chlorides of aluminum and silicon. By the first stage of the selective process then, it is possible to make a separation between aluminum and silicon chlorides. However, it is preferred to combine the products of both stages and to separate the constituents in the same apparatus. For the reason that the products are combined, it is not, therefore, essential that the two stages be conducted to differentiate sharply between them. There will be no harm if a quantity of the material sensitive to the first stage passes through the charge and is chlorinated in the second stage.

The volatile material leaves the chlorinator 10 by an exit pipe 26, and it then enters a condensing system which may vary in character for the product desired and for the character of vapors generated. In the present instance all the chlorides above named are present, as well as carbon dioxide, carbon monoxide and chlorine. The first part of the system comprises a condenser 27 maintained at a temperature sufficient to permit the passage of the silicon tetrachloride uncondensed. When the condensing temperature is so maintained that the iron chloride and the aluminum chloride are condensed, a portion of the titanium chloride is condensed and a portion passes through uncondensed. The vapors passing through the first condenser may be further treated to remove the silicon and titanium chlorides from the chlorine, the carbon monoxide and the carbon dioxide in any well known manner. In the present instance the uncondensed gases are drawn from the condenser 27, first passing through a suitable filter 28 which separates the aluminum chloride powder from the gases, thence by pipe 29 to a washer 30 containing dry rock salt at about 100° centigrade. The rock salt serves to remove any aluminum chloride powder entrained in the gases by forming a liquid double chloride of aluminum and sodium.

For the purpose of recovering the carbon dioxide and the carbon monoxide the gases are passed through a pipe 31 into a scrubber 32 wherein water flows against the gases. A water inlet 33 is provided at the top of the scrubber. The scrubber is open at the bottom and sets in a well 34 containing liquid 35 to form a seal. The flowing water in the scrubber acts upon the metal chlorides entrained in the gases and liberates hydrochloric acid, which dissolves in the water forming also oxides of the metals. The inside of the scrubber is filled with a neutralizing agent such as limestone 36. Limestone or some other carbonate is preferred as the neutralizing agent because the action of the hydrochloric acid formed liberates carbon dioxide equivalent to the chlorides present in the gases. The resulting calcium chloride is washed away as the liquid 35 overflows from the well at the point 37. The oxide formed in the scrubber settles to the bottom of the well and can be recovered, dried and processed as part of the clay charge 11. The gases leave the scrubber 32 by a pipe 38 and enter a similar scrubber 39 filled with an inert material, such as brick 40, over which a solution of sodium carbonate flows from the nozzle 41. Any chlorine or acid which may be present in the scrubber 39 is taken up by the soda, forming an equivalent of carbon dioxide. Under the foregoing treatment the gases which leave the scrubber 39 contain only carbon dioxide and carbon monoxide. This mixture is returned to the carbon monoxide generator 12, passing through a pipe 42 leading from the scrubber 39 to a pump 43, through a drier 44, containing preferably sulphuric acid, and thence by pipe 45 to the generator. A bleeder valve 46 is provided to release excess carbon dioxide formed in the process.

It will be observed that the drier 44 may be made sufficiently efficient so that the drier 16 may be eliminated as a means of drying the carbon monoxide. By otherwise drying the chlorine employed it becomes possible to combine the generator 12 with the chlorinator as shown in Figure 2. In this modification there is a deeper bed of carbon 50 at the bottom of the chlorination apparatus 51 in order to provide sufficient carbon to form the carbon monoxide generator. Air or carbon dioxide may enter the generator at 52 to form carbon monoxide. The port 53 is employed and may serve to permit cleaning the generator or to provide an entry for carbon for the generator. The top of the carbon bed is designated at 54 and this corresponds to the zone 25 of Figure 1. Below the level 54 chlorine is introduced as at the points designated 55 along the line 56. Above the line 56 the portion 57 of the carbon bed corresponds to the preheater 21 of Figure 1, and the portion of the carbon bed below the line 56 corresponds to the generator 12 of Figure 1.

Another feature of the process is the method of treating the condensate from the condenser 27 to remove the aluminum chloride as a pure product. It contains as the chief impurities iron chloride and titanium chloride in amounts varying, of course, with the composition of the mineral employed.

The apparatus is shown in Figure 3 and a description of the apparatus may be combined with a description of the purification process. The mixed chlorides are first commingled with scrap iron, such as filings or turnings, and are distilled from a vessel 60 maintained at about 195° to 220° centigrade. The ferric chloride is reduced by the excess iron to ferrous chloride by the following reaction:—

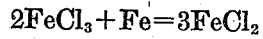

$$2FeCl_3 + Fe = 3FeCl_2$$

Ferric chloride and aluminum chloride will distill over together, but ferrous chloride has a much higher sublimation point, so that it remains behind in the vessel. A substantial portion of the iron impurity is removed by this method, but it is quite possible that a certain amount of ferric chloride distills over with the aluminum chloride without having encountered iron in its passage through the vessel 60. The distilled vapors are passed through an elongated chamber 61 maintained at 195° to 210° centigrade, wherein they are caused to pass over a large surface of iron, as presented by steel wool 62. The purification process is thus completed and this insures that no iron content remains in the aluminum chloride. It is necessary to clean the steel wool frequently from the coating of ferrous chloride which is formed thereon and which covers the active iron rendering the wool useless for purification purposes. The cleaning of the wool is readily accomplished by washing it to dissolve the ferrous chloride and then drying the wool under non-oxidizing conditions.

From the foregoing description it is clear that the invention provides a method of separating different portions of minerals by selective chlorination, that aluminum chloride can be formed without the formation of silicon tetrachloride from a mixture of alumina and silica, and likewise that silica can be freed from its alumina and iron content.

Another great advantage of the process is that a chlorination process can be carried out which furnishes its own heat by means of the heat of oxidation of the reducing agent employed, namely, carbon monoxide. This permits the construction of large chlorinating units, in which the reaction will be self sustaining.

In the foregoing the process has been particularly described as employing in combination the new process involving carbon monoxide and the old process involving carbon as the reducing agent. In the new process the heat produced is more than sufficient to effect chlorination. In the old process the heat produced is insufficient to sustain chlorination, without the addition of heat. Therefore, by combining the two processes, as herein disclosed, the excess of heat of the new may be made to compensate for the deficiency in the heat of the old. By varying the extent to which each reaction takes place the total heat may be varied to suit any desired conditions. One manner of varying the extent to which the two reactions take place consists in varying the amount of carbon associated with the charge. In the process employed in the apparatus described, wherein no carbon is mixed with the initial clay charge, the ratio of carbon to charge may be varied by increasing the ratio of the area of the carbon bed to the bulk of the charge, or by controlling the rate at which both the chlorine and the carbon monoxide are fed through the coal bed. In the latter method the gases first react with carbon as the reducing agent. By supplying insufficient chlorine, the same may be exhausted in passing through the charge above the coal bed, and therefore the extent of the reaction involving carbon monoxide and the chlorine may be lessened as compared to the extent of the reaction involving carbon and chlorine. Various other modifications of the process are also possible as contemplated by the appended claims, such for example, as a change from chlorine to another halogen.

We claim:—

1. A process for the selective chlorination of a mixture of oxide minerals capable of forming volatile chlorides, which comprises subjecting the mineral mixture to the action of mixed carbon monoxide and chlorine at the reaction temperature, whereby a portion of the mineral including any alumina, iron oxide and titanium oxide content is converted into chlorides, leaving a residual material containing any silica and aluminum silicate, and subjecting the residual material to the action of chlorine and carbon, whereby to form chlorides of any of the residual constituents named.

2. A process for producing volatile metal chlorides from an oxide mineral mixture which comprises placing the mixture on a bed of heated carbon, passing chlorine through a portion of the bed of carbon whereby the carbon and the chlorine effect a reduction and chlorination with the formation of carbon monoxide, passing the carbon monoxide and the chlorine through the mixture to reduce and chlorinate selectively the constituents of the mixture with the formation of carbon dioxide, regenerating carbon monoxide from said carbon dioxide, and passing said carbon monoxide through the mixture on the carbon bed.

3. The process of producing chlorides from the constituents of an oxide mineral mixture which comprises treating a portion of the mixture with chlorine and carbon simultaneously, forming carbon monoxide, and treating the remainder of the mixture in the absence of carbon with carbon monoxide and chlorine, with the formation of carbon dioxide.

4. The process of producing chlorides from the constituents of an oxide mineral mixture which comprises treating the mineral with a mixture of chlorine and carbon monoxide, whereby to form certain chlorides and carbon dioxide, separating the carbon dioxide from the chlorides, and regenerating carbon monoxide from the carbon dioxide for recirculation through the charge.

5. The process of producing chlorides from the constituents of an oxide mineral which comprises placing the mineral containing no carbon in contact with a body of heated carbon, passing carbon monoxide and chlorine through the charge from the body of heated carbon, forming carbon dioxide and volatile chlorides, recovering the carbon dioxide from the product, and passing the recovered gas through the bed of carbon to provide the carbon monoxide initially active on the charge.

6. A method of preparing aluminum chloride from a mineral containing alumina and aluminous silicate, and certain impurities of which silica and iron are examples, which comprises treating the mineral with carbon monoxide and chlorine to volatilize the alumina content and any iron content, and to leave all the silicon containing compounds unacted upon by the chlorine.

7. A method of preparing aluminum chloride from a mineral containing alumina and aluminous silicate, and certain impurities of which silica and iron are examples, which comprises treating the mineral with carbon monoxide and chlorine to valatilize the alumina content and any iron content, and to leave a residue containing any silica and the aluminum silicate, and treating the residue with chlorine in the presence of carbon.

8. A method of preparing aluminum chlorides from a mineral containing alumina and aluminous silicate, and certain impurities of which silica and iron are examples, which comprises treating the mineral with carbon monoxide and chlorine to volatilize the alumina content and any iron content, and to leave a residue containing any silica and the aluminous silicate, treating the residue with chlorine in the presence of carbon, forming carbon monoxide, and using the carbon monoxide in the first recited stages of the chlorination.

9. A method of separating silica from alumina which comprises chlorinating the mixed compounds free from carbon using carbon monoxide as the reducing agent, whereby aluminum chloride is formed with a residual silica.

10. A method of separating alumina from aluminum silicate which comprises chlorinating the mixed compounds free from carbon using carbon monoxide as the reducing agent, whereby aluminum chloride is formed with a residual aluminum silicate.

11. The process of reducing and chlorinating oxide minerals containing alumina, which comprises as step A passing chlorine and carbon monoxide through the mineral unmixed with carbon, whereby carbon dioxide, aluminum chloride and a residue are formed, reducing the carbon dioxide to carbon monoxide, mixing the residue with carbon, passing a portion of said carbon monoxide and chlorine through the admixture of residue and carbon forming more carbon monoxide, and using said carbon monoxide in step A.

In witness whereof, we hereunto subscribe our names this 30th day of July, 1926.

GERALD D. MUGGLETON.
PAUL S. BRALLIER.
HAROLD C. VAN GALDER.
RALPH F. WEBBER.